United States Patent
Yamada et al.

(10) Patent No.: US 8,902,237 B2
(45) Date of Patent: Dec. 2, 2014

(54) IMAGE GENERATING APPARATUS AND IMAGE GENERATING METHOD

(75) Inventors: Kazuhiko Yamada, Tokyo (JP); Tomoaki Ryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 210 days.

(21) Appl. No.: 13/513,521

(22) PCT Filed: Sep. 1, 2010

(86) PCT No.: PCT/JP2010/005377
§ 371 (c)(1),
(2), (4) Date: Jun. 1, 2012

(87) PCT Pub. No.: WO2011/074157
PCT Pub. Date: Jun. 23, 2011

(65) Prior Publication Data
US 2012/0236008 A1 Sep. 20, 2012

(30) Foreign Application Priority Data
Dec. 15, 2009 (JP) ................................. 2009-283642

(51) Int. Cl.
*G06T 13/00* (2011.01)

(52) U.S. Cl.
CPC ..................................... *G06T 13/00* (2013.01)
USPC ........................................................ 345/473

(58) Field of Classification Search
CPC ... G06T 13/00; G06T 2213/04; H04N 19/004
USPC .......................................................... 345/473
See application file for complete search history.

(56) References Cited

U.S. PATENT DOCUMENTS

| | | | |
|---|---|---|---|
| 4,910,683 A | * | 3/1990 | Bishop et al. ................. 345/427 |
| 6,184,879 B1 | | 2/2001 | Minemura et al. |

FOREIGN PATENT DOCUMENTS

| | | |
|---|---|---|
| JP | 4-111078 A | 4/1992 |
| JP | 8-16810 A | 1/1996 |
| JP | 9-62862 A | 3/1997 |
| JP | 9-81769 A | 3/1997 |
| JP | 9-293144 A | 11/1997 |
| JP | 2001-013936 A | 1/2001 |
| JP | 2002-92626 A | 3/2002 |
| JP | 2003-92706 A | 3/2003 |
| JP | 2004-13629 A | 1/2004 |
| JP | 2004-295857 A | 10/2004 |
| JP | 2006-107132 A | 4/2006 |
| JP | 2007-121758 A | 5/2007 |
| JP | 2007-286745 A | 11/2007 |
| JP | 2008-71241 A | 3/2008 |

* cited by examiner

*Primary Examiner* — Hau Nguyen
(74) *Attorney, Agent, or Firm* — Birch, Stewart, Kolasch & Birch, LLP

(57) ABSTRACT

Disclosed are an image generating apparatus and an image generating method with which the size of a storage region required to display animated images can be suppressed. In the image generating apparatus (1), processing blocks (12, 16, 17) configuring an image generation unit obtain object data segment ($130_p$) and a display operation pattern to be applied to the object data segment ($130_p$) from data storage units (13, 14), in accordance with a specified picture-plane configuration information item ($150_i$), and generate animated images of the object data segment ($130_p$) in accordance with the object data segment ($130_p$) and the display operation pattern.

7 Claims, 12 Drawing Sheets

| TYPE | DATA STRING | OPERATION |
|---|---|---|
| 1 | [30][5, 2, 1.1, 1.1][10, 2, 1.1, 1.1][15, 2, 1.1, 1.1] ... [FFFF] | FOR 30 FRAMES, SCALE UP IN EVERY FIVE FRAMES |
| 2 | [30][1, 2, 1.61, 1.61][5, 2, 0.91, 0.91][10, 2, 0.91, 0.91] ... [FFFF] | FOR 30 FRAMES, SCALE DOWN IN EVERY FIVE FRAMES (SCALE UP ONCE IN A FIRST FRAME) |
| 3 | [300][20, 2, 1.25, 1][40, 2, 0.8, 1][60, 2, 1.25, 1] ... [FFFF] | FOR 300 FRAMES, EXPAND OR CONTRACT VERTICALLY IN EVERY TWENTY FRAMES |
| 4 | [300][15, 3, 90][30, 3, 90][45, 3, 90][60, 3, 90] ... [FFFF] | FOR 300 FRAMES, ROTATE BY 90 DEGREES IN EVERY FIFTEEN FRAMES |
| 5 | [300][20, 3, 30][40, 3, 300][60, 3, 60][80, 3, 300] ... [FFFF] | FOR 300 FRAMES, ROTATE BY ±30 DEGREES IN EVERY TWENTY FRAMES |
| .... | .... | .... |

FIG. 4A

[total frame] [frame No, action, data, data, ..] [frame No, action, data, data, ..] ... [end]

FIG. 4B

```
picture_data () {
  picture_id
  num_of_parts
  for (k=0;k<num_of_parts;k++ ){
    x_offset
    y_offset
    scale
    object_name
    animation_type
  }
}
```

FIG. 5

```
cmd = put, obj_id = 1
cmd = ret
cmd = ret
cmd = ret
cmd = ret
cmd = mod, obj_id = 1, matrix_A = 1.1, matrix_E = 1.1
cmd = ret
cmd = ret
cmd = ret
cmd = mod, obj_id = 1, matrix_A = 1.1, matrix_E = 1.1
........
cmd = ret
cmd = end
```
{ 160C

```
obj_id = 1
0x1000f87a, 0xeaf60748, 0x0000ffff, 0x413b0440, 0x1043l2ff, 0x00000104,
0xf4eaf611, 0x0d2f2102, 0x54110350, 0x21fdac11, 0x048b21fb, 0xd011fb75,
0x21f7b611, 0xfc480107, 0xdaf339a1, 0x04a00902, 0xfbd00459, 0xfad808d6,
0x21052891, 0xf72a400f, 0xff .......
```
{ 160J

FIG. 6

IMAGE GENERATING APPARATUS AND IMAGE GENERATING METHOD

FIELD OF THE INVENTION

The present invention relates to an image processing technology for generating animated images (moving images) by using vector-format data.

BACKGROUND ART

Vector graphics data include parameters expressing information such as the coordinates of the start point and end point of a curve to be displayed, color, size, and shape, and since these parameters are used in transformation processing such as scaling up, scaling down, and rotation of an image, high-quality drawing output can be obtained. Because they are smaller in data size than raster format data (raster graphics data) such as bitmap data, the vector format data are suitable for displaying animated images.

One technology for generating animated images by using vector graphics data is disclosed in Japanese Patent Application Publication No. 2007-121758 (patent document 1), for example. If a function to display different animated images for each scene plane is implemented, preparing different vector graphics data for each scene plane causes the size of the storage region of the vector graphics data to increase. For example, on-screen display (OSD) is used to display additional information such as date, time, title, and program information on a screen and also to display a picture plane for setting which allows the user to make a variety of settings such as picture quality, display position, and brightness. In that case, if vector graphics data including animation information was prepared for each of the great number of picture planes, a very large storage region would be necessary. The screen display apparatus disclosed in patent document 1 identifies a hierarchical picture plane corresponding to the type of an input key with reference to a scene resource ID table held in the vector graphics data and generates animated images in accordance with a scene reproduction script corresponding to the hierarchical picture plane. Use of the scene reproduction script eliminates the need for preparing vector graphics data including animation information for each hierarchical picture plane.

PRIOR ART REFERENCES

Patent Documents

Patent document 1: Japanese Patent Application Publication No. 2007-121758

SUMMARY OF THE INVENTION

Problem to be Solved by the Invention

If a great number of objects (display items) expressing time, title, program information, and so on are displayed in a hierarchical picture plane, the great number of objects would cause a vast number of combinations of hierarchical picture planes and objects. In that case, vector graphics data including animation information corresponding to individual objects must be stored in memory beforehand, and the size of the storage region of the graphics data would become large.

In view of the above, it is an object of the present invention to provide an image generating apparatus and an image generating method that can suppress the size of the storage region required to display animated images.

Means for Solving the Problem

An image generating apparatus according to the present invention has: a first data storage unit for storing a plurality of vector graphics data segments; a second data storage unit for storing operation information defining a plurality of types of display operation patterns for any one of the vector graphics data segments in units of frames by using transformation matrices; a third data storage unit for storing a plurality of picture-plane configuration information items which identifies a vector graphics data segment to be displayed in a display plane, out of the plurality of vector graphics data segments, and also identifies a display operation pattern to be assigned to the vector graphics data segment to be displayed, out of the plurality of types of display operation patterns; and an image generation unit for obtaining a graphics data segment from the first data storage unit, in accordance with the picture-plane configuration information item specified out of the plurality of picture-plane configuration information items, obtaining a display operation pattern to be applied to the obtained vector graphics data segment from the third data storage unit, and generating animated images of the obtained vector graphics data segment in accordance with the obtained vector graphics data segment and the obtained display operation pattern.

An image generating method according to the present invention includes: a step of identifying a vector graphics data segment to be displayed in a display plane, out of vector graphics data segments, and referencing a third data storage unit storing a plurality of picture-plane configuration information items identifying a display operation pattern to be assigned to the vector graphics data segment to be displayed, out of a plurality of types of display operation patterns for any one of the vector graphics data segments; a step of obtaining a vector graphics data segment and a display operation pattern to be applied to the vector graphics data segment, from a first data storage unit storing the plurality of vector graphics data segments and a second data storage unit storing operation information defining the plurality of types of display operation patterns in units of frames by using transformation matrices, in accordance with the picture-plane configuration information item specified out of the plurality of picture-plane configuration information items; and a step of generating animated images of the obtained vector graphics data segment in accordance with the obtained vector graphics data segment and the obtained display operation pattern.

Effects of the Invention

According to the present invention, the size of the storage region required to display animated images can be suppressed.

BRIEF DESCRIPTION OF THE DRAWINGS

FIG. 4A is a view showing an example of contents of an animation table; FIG. 4B is a view illustrating a data string format in the animation table.

FIG. 5 is a view schematically showing an example of a data structure of picture-plane configuration information.

FIG. 6 is a view schematically showing an example of configuration of animation data.

MODE FOR CARRYING OUT THE INVENTION

Embodiments of the present invention will be described with reference to drawings.

First Embodiment

Figure 1:
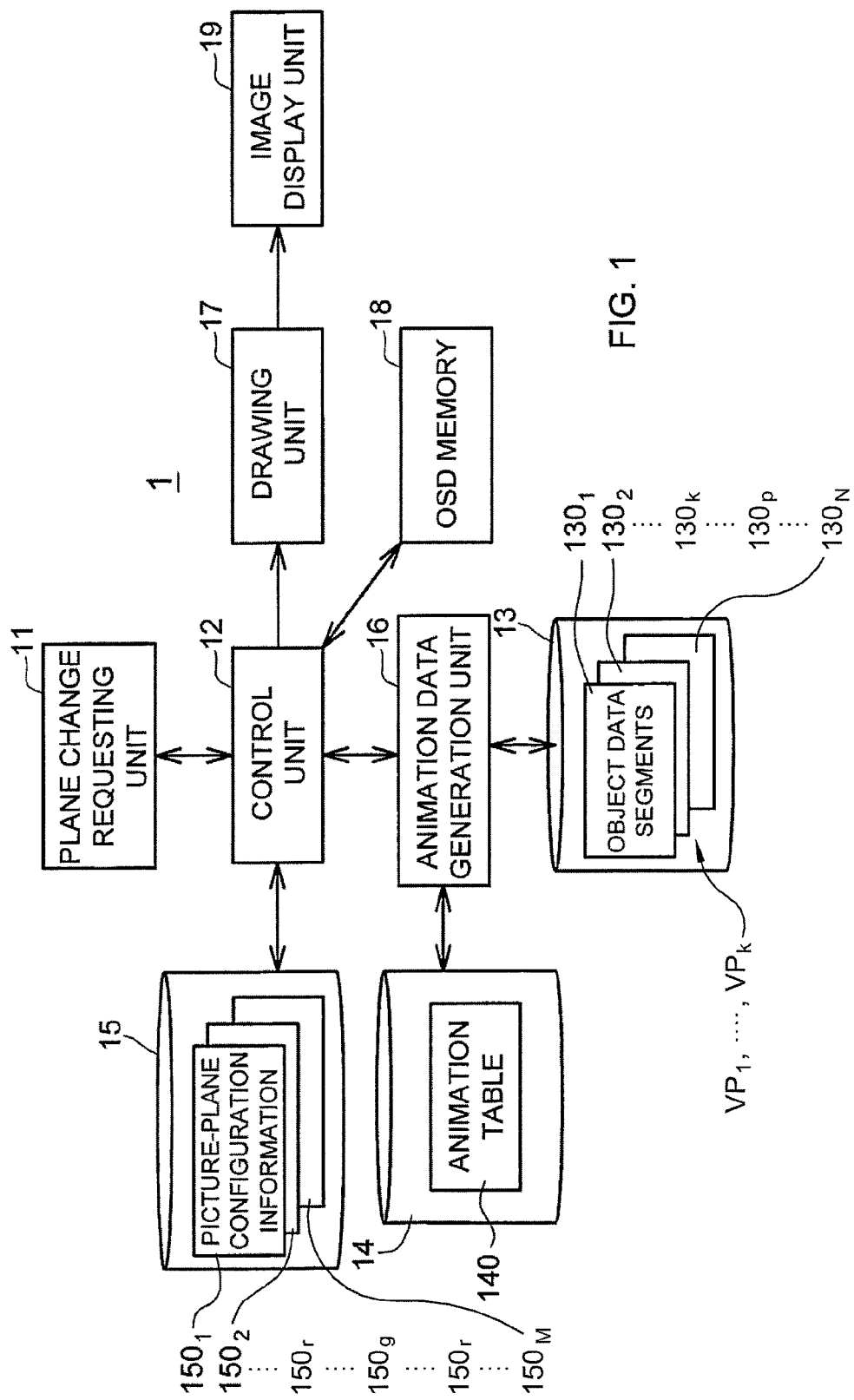
FIG. 1 is a functional block diagram schematically showing a configuration of an image display apparatus of a first embodiment of the present invention.

FIG. 1 is a functional block diagram schematically showing the configuration of an image display apparatus 1 of a first embodiment of the present invention. As shown in FIG. 1, the image generating apparatus 1 includes a plane change requesting unit 11, a control unit 12, data storage units 13, 14, 15, an animation data generation unit 16, a drawing unit 17, an OSD (On-Screen Display) memory 18, and an image display unit 19. The control unit 12, animation data generation unit 16, and drawing unit 17 configure an image generation unit.

The plane change requesting unit 11 has a function to receive data input by user's key operation and text data transferred from external equipment (not shown). The plane change requesting unit 11 includes key input devices (such as a keyboard and a remote controller), pointing devices (such as a mouse), and an interface circuit having a function to communicate with the external equipment. The plane change requesting unit 11 can also transfer user-input information to the control unit 12.

Figure 2A:
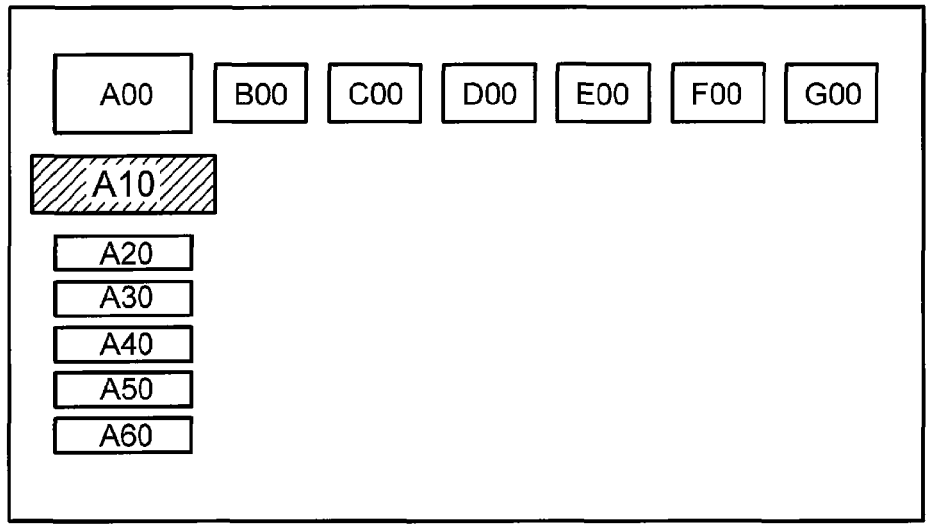
FIGS. 2A and 2B are schematic views showing an example of a display plane including animated images.
Figure 2B:
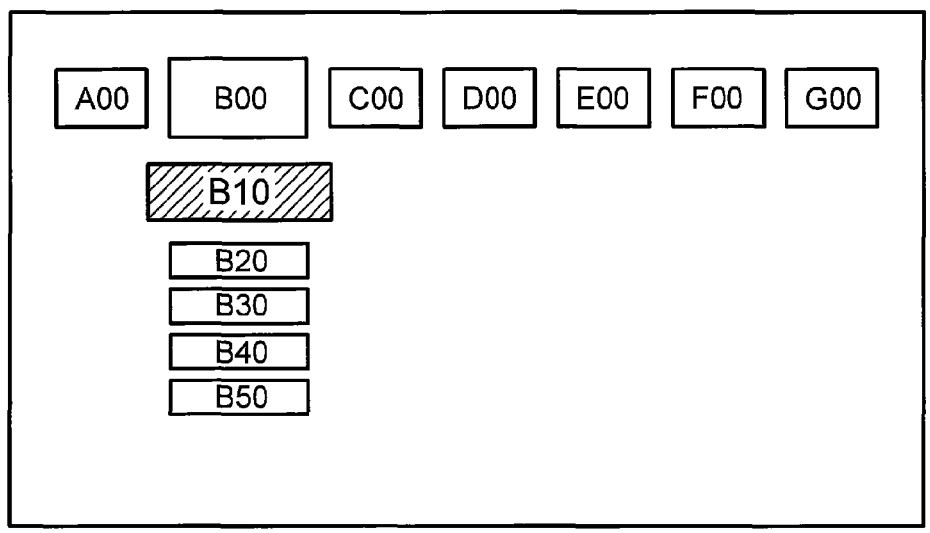
Figure 3A:
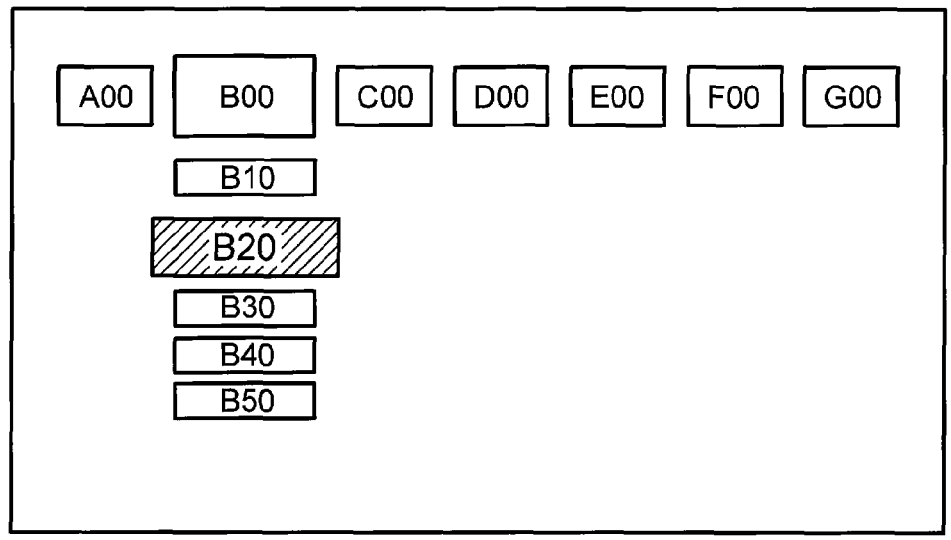
FIGS. 3A and 3B are schematic views showing another example of a display plane including animated images.
Figure 3B:
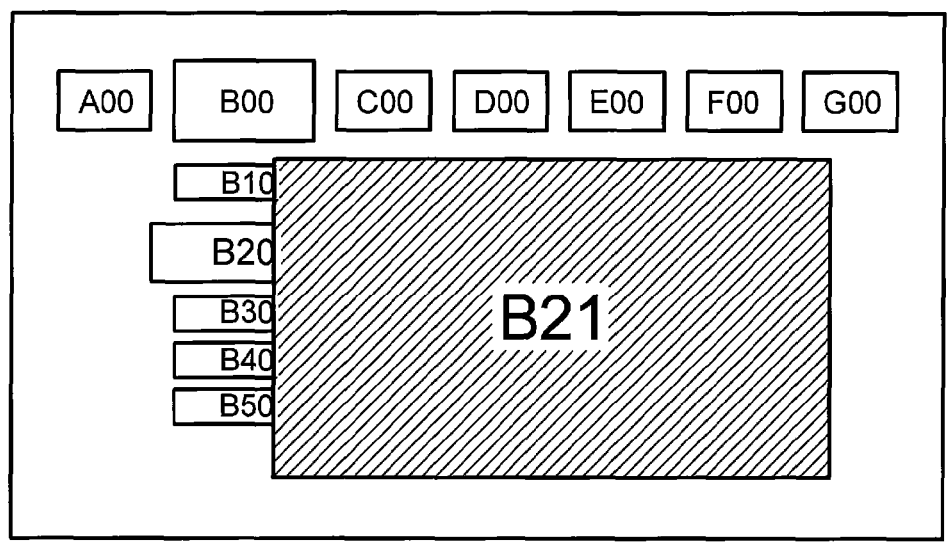

The image generating apparatus 1 has a function to display animated images in the display plane in the image display unit 19. FIGS. 2A, 2B, 3A, 3B are views schematically showing examples of display plane data including animated images. As shown in FIG. 2A, the display plane displays first-element objects A00, B00, C00, D00, E00, F00, G00 and displays second-element objects A10, A20, A30, A40, A50, A60 corresponding to the object A00. FIG. 2A shows a state in which the object A00 is selected, and a magnified view of the lower object A10 is given. When the user makes a key operation on the plane change requesting unit 11 to move the selected position to an adjacent position on the right, the display plane changes from the state shown in FIG. 2A to the state shown in FIG. 2B. In the display plane shown in FIG. 2B, the second-element objects A10, A20, A30, A40, A50, A60 corresponding to the object A00 disappear, and second-element objects B10, B20, B30, B40, B50 corresponding to the object B00 are displayed. The state shown in FIG. 2B indicates that the object B00 is selected. When the user makes a key operation on the plane change requesting unit 11 to move the selected position to an adjacent position below, the display plane changes from the state shown in FIG. 2B to the state shown in FIG. 3A. The state shown in FIG. 3A indicates that the object B20 is selected, and a magnified view of the object B20 is given. When the user makes a key operation on the plane change requesting unit 11 to select the object B20, the display plane changes from the state shown in FIG. 3A to the state shown in FIG. 3B. In the display plane shown in FIG. 3B, a third-element object B21 corresponding to the object B20 is displayed. As shown in FIGS. 2A, 2B, 3A, 3B, the first-element objects A00, B00, C00, D00, E00, F00, G00 are always displayed, a second-element object (such as B10, B20, etc.) is displayed when the corresponding higher object (such as B00) is selected and is not displayed when the corresponding higher object is not selected. The third-element object B21 is displayed in a given area, overlapping the second-element objects B10, B20, B30, B40, B50.

The control unit 12, animation data generation unit 16, and drawing unit 17 can be configured by an integrated circuit including a microprocessor such as the CPU, a read only memory (ROM), a random access memory (RAM), a timer circuit, an input-output interface, and a specialized processing unit, for example. All or part of the functions of the control unit 12, animation data generation unit 16, and drawing unit 17 can be implemented by hardware or can be implemented by computer programs executed by the microprocessor. If all or part of the functions of the control unit 12, animation data generation unit 16, and drawing unit 17 is implemented by computer programs (including executable files), the microprocessor can implement the corresponding functions by loading the computer programs or corresponding executable files from a computer-readable recording medium and executing them.

The data storage units 13, 14, 15 can be configured by using memories such as a non-volatile memory, a hard disk drive (HDD), or an optical disk. The data storage units 13, 14, 15 can be configured in storage regions of different memories or in different storage regions of the same memory.

The data storage unit 13 stores a plurality of vector object data segments $130_1$ to $130_N$ (where N is a positive integer greater than or equal to 2). The object data segments $130_1$ to $130_N$ are material data for generating animated images and include vector graphics data and vector font data (outline font data).

The data storage unit 14 stores an animation table (operation information) 140 for defining a plurality of types of display operation patterns (animation types) for the object data segments $130_1$ to $103_N$ in units of frames by using transformation matrices. The transformation matrices are used in matrix operations for scaling up or down, rotating, or translating an object image expressed by graphics data. The object data segments $130_1$ to $130_N$ are static data, not including display information indicating a temporal alteration, and the display operation patterns described in the animation table 140 are information for animating these static object data segments $130_1$ to $130_N$.

FIG. 4A is a view showing an example of the contents of the animation table 140, and FIG. 4B is a view illustrating a data string format in the animation table 140. As shown in FIG. 4A, numbers '1', '2', etc. indicating types of display operation patterns and data strings corresponding to the numbers are included. The 'operation' item corresponding to the number is provided to explain the operation of the corresponding data string and may not be included in the actual animation table 140. As shown in FIG. 4B, each data string begins with a data element [total frame] indicating the number of frames in a single period of the animation operation and ends with a data element [end] (=[FFFF]) indicating the end of the data string. Between these two data elements [total frame] and [end], one data element [frame No, action, data, data, . . . ] is present at least. Each data element [frame No, action, data, data, . . . ] defines an animation operation. In the data element [frame No, action, data, data, . . . ], 'frame No' specifies the number of a special frame in a series of frames; 'action' is a number specifying an operation, which is translation, scaling up or down, or rotation of the object data segment in the specified frame; 'data' are values specifying the x and y coordinates of the destination of translation of the object data segment, the vertical and horizontal scaling factors at which the object data segment are scaled up or down, or an angular displacement of rotation of the object data segment.

The data storage unit 15 stores picture-plane configuration information items $150_1$ to $150_M$. Each of the picture-plane configuration information items $150_1$ to $150_M$ identifies the graphics data to be displayed in the display plane in the image display unit 19, out of the object data segments $130_1$ to $130_N$, and identifies the display operation pattern to be assigned to the graphics data to be displayed, out of the plurality of types of display operation patterns shown in FIG. 4A. FIG. 5 is a view schematically showing an example of the data structure of the picture-plane configuration information item $150_m$ (where m is any of 1 to N). In FIG. 5, 'picture_id' is a picture identifier (picture ID) assigned to a display plane data item, and 'num_of_parts' indicates the number of object data segments $130_1$ to $130_N$ configuring each item of display plane data (or the total number of objects displayed in the single display plane). In addition, 'x_offset' is the x coordinate of the drawing position of the k-th object data segment $130_k$ in the display plane; 'y_offset' is the y coordinate of the drawing position of the object data segment $130_k$ in the display plane; 'scale' is the scaling factor at which the object data segment $130_k$ is scaled up or down; 'object_name' is a name specifying the object data segment $130_k$; 'animation_type' is a number specifying the type of the display operation pattern to be applied to the object data segment $130_k$.

The animation data generation unit 16 has a function to obtain the object data segment $130_p$ and the display operation pattern assigned to the data from the data storage units 13, 14, in accordance with the picture-plane configuration information item $150_i$ specified out of the picture-plane configuration information items $150_1$ to $150_m$ by the control unit 12, and generate dynamically animation data including the object data segment $130_p$ and the display control command corresponding to the object data segment $130_p$. Here, the object data segment $130_p$ is identified by 'object_name' (FIG. 5) in the picture-plane configuration information item $150_i$, and the display operation pattern is identified by 'animation_type' (FIG. 5) in the picture-plane configuration information item $150_i$. The control unit 12 stores the animation data in a storage region of the OSD memory 18.

FIG. 6 is a view schematically showing an example of the configuration of animation data of a single object data segment. As shown in FIG. 6, the animation data include a display control command group (coordinate transform command group) 160C and object data segment 160J identified by 'obj_id' (object ID). The display control command group 160C shown in FIG. 6 corresponds to the first type of display operation pattern shown in FIG. 4A. In the display control command group 160C shown in FIG. 6, 'put, obj_id=1' indicates a command for drawing the first object data segment $130_1$; 'mod, obj_id=1, matrix_A=1.1, matrix_E=1.1' means the scaling up or down of the object data segment $130_1$ by using the transformation matrices 'matrix_A' and 'matrix_E' in the corresponding frame; 'matrix_A=1.1' means the scaling up of the object data segment $130_1$ by a factor of 1.1 in the X-axis direction; 'matrix_E=1.1' means the scaling up of the object data segment $130_1$ by a factor of 1.1 in the Y-axis direction. 'end' is a command to end the display of animated images.

Figure 7:
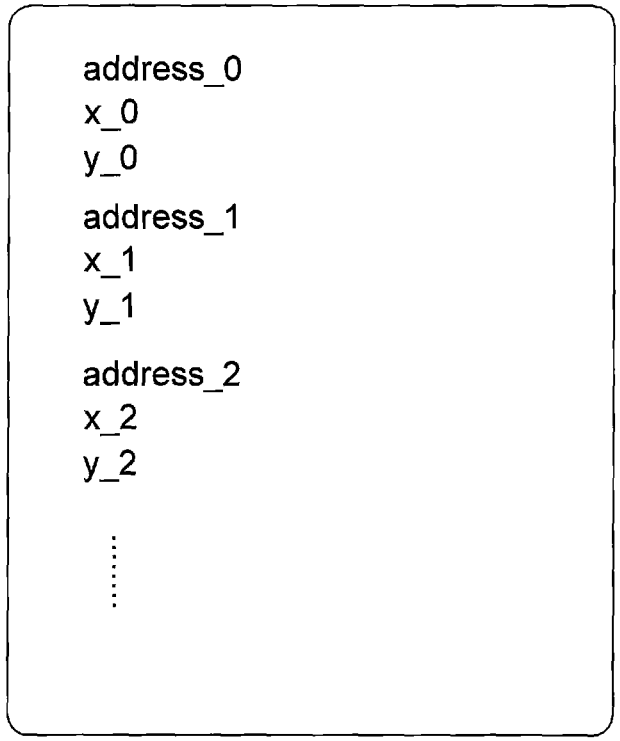
FIG. 7 is a view schematically showing an example of a picture-plane display list.

The control unit 12 has a function to generate a picture-plane display list (a list-generation function) for determining drawing positions in the display plane of individual items of the object data segment $130_p$ identified by the picture-plane configuration information item $150_i$. FIG. 7 is a view schematically showing an example of the picture-plane display list. As shown in FIG. 7, the picture-plane display list includes combinations of 'address_i' indicating the first address of the i-th animation data in the storage region of the OSD memory 18, 'x_i' indicating the x coordinate of the drawing position of the object data segment corresponding to the i-th animation data, and 'y_i' indicating the Y coordinate of the drawing position of the object data segment corresponding to the i-th animation data. The control unit 12 stores the data of this picture-plane display list in a storage region of the OSD memory 18.

The drawing unit 17 is a graphics engine for processing vector-format data and operates in response to instructions from the control unit 12 for starting reproduction, switching the reproduction, or stopping reproduction. When instructions to start reproduction are received from the control unit 12, the drawing unit 17 generates display plane data including animated images on the basis of the picture-plane display list placed in the OSD memory 18 and the corresponding animation data group. The generated display plane data are output to and displayed by the image display unit 19.

Figure 8:
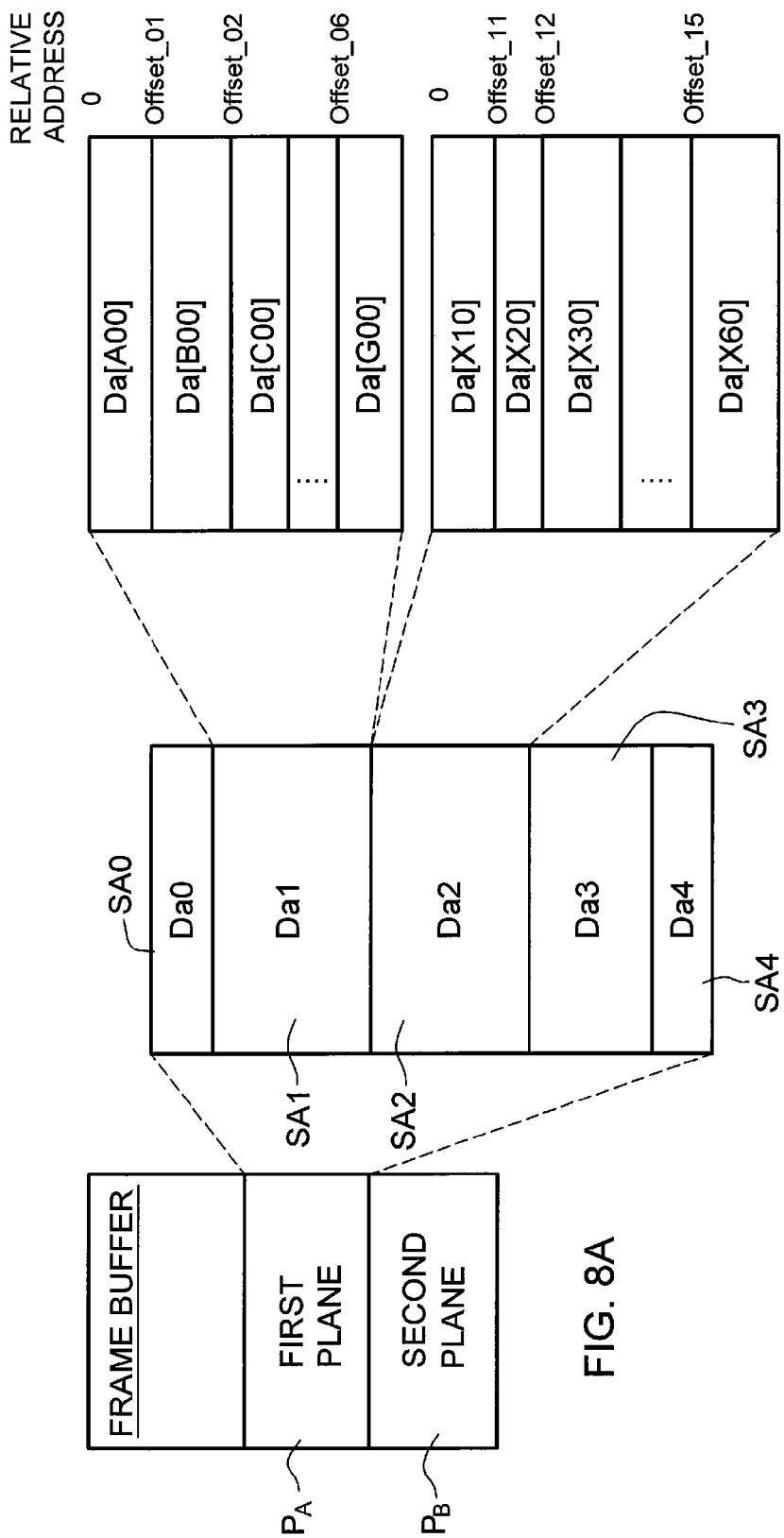
FIGS. 8A, 8B, and 8C are views showing examples of the storage regions of an OSD memory in the first embodiment.

FIGS. 8A, 8B, and 8C are views showing examples of storage regions of the OSD memory 18 in the first embodiment. As shown in FIG. 8A, the OSD memory 18 has a frame buffer having storage regions of a first plane $P_A$ and a second plane $P_B$. While either the first plane $P_A$ or the second plane $P_B$ is used as a storage region for the currently displayed data, the other plane is used as a storage region for the data to be displayed next. As shown in FIG. 8B, the storage region of the first plane $P_A$ includes a storage area SA0 for the picture-plane display list Da0, a storage area SA1 for first-element animation data Da1, a storage area SA2 for second-element animation data Da2, a storage area SA3 for third-element animation data Da3, and a storage area SA4 for on-screen subtitle display data Da4. The storage area SA1 is an area for the first-element objects A00, B00, C00, D00, E00, F00, G00 (FIGS. 2A, 2B, 3A, 3B), for example; the storage area SA2 is an area for the second-element objects (such as A10, A20); the storage area SA3 is an area for the third-element objects (such as B21). The on-screen subtitle display storage area SA4 is used for on-screen subtitle display of vector fonts. The storage areas SA1, SA2, SA3 have the same structure. In the storage area SA1, as shown in FIG. 8C, the first-element animation data Da[A00], Da[B00], Da[C00], Da[D00], Da[E00], Da[F00], Da[G00] are stored in the corresponding areas specified by relative addresses '0', 'Offset_01', 'Offset_02', . . . , 'Offset_06', as shown in FIG. 8C. In the storage area SA2, the second-element animation data Da[X10], Da[X20], Da[X30], Da[X40], Da[X50], Da[X60], Da[X70] (X10 to X70 are of a second element group of A10 to A70, B10 to B70, C10 to C70, D10 to D70, E10 to E70, F10 to F70, or G10 to G70) are stored in the corresponding areas specified by relative addresses '0', 'Offset_11', 'Offset_12', 'Offset_15'. The first-element objects A00, B00, C00, D00, E00, F00, and G00 are always displayed. One object is selected out of these first-element objects A00, B00, C00, D00, E00, F00, and G00, and the other objects are placed in an unselected state.

The animation data for the second-element objects X10 to X70 corresponding to the selected first-element object are placed in the storage area SA2. Of the second-element objects X10 to X70, a single object can be placed in the selected state, and the other objects can be placed in the unselected state.

Figure 9:
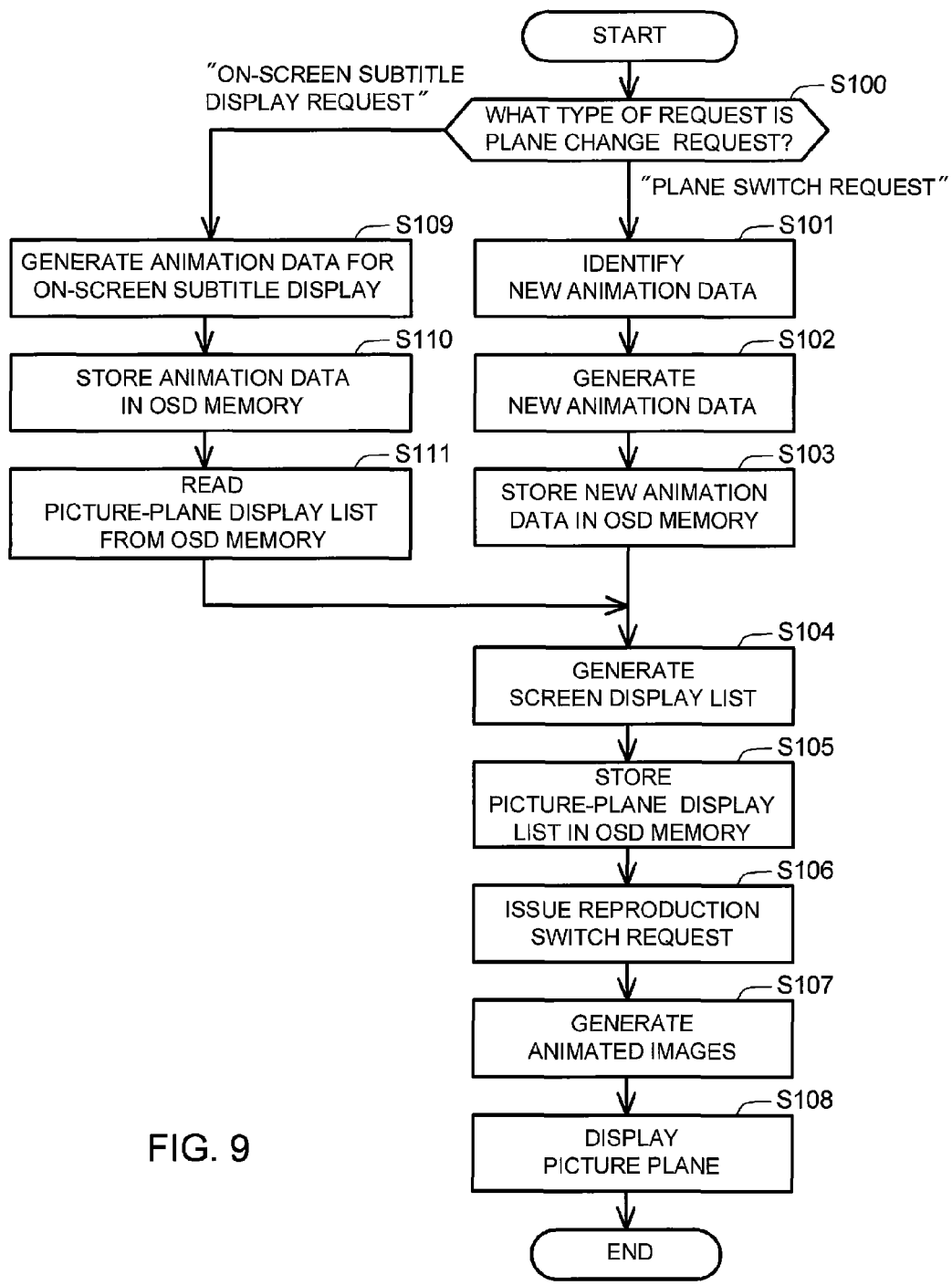
FIG. 9 is a flowchart schematically illustrating steps of an image generation process in the first embodiment.

With reference to FIG. 9, the operation of the image generating apparatus 1 having the configuration described above will next be described. FIG. 9 is a flowchart schematically illustrating steps of an image generation process in the first embodiment. When the plane change requesting unit 11 issues a plane change request, the control unit 12 starts the image generation process shown in FIG. 9. When the plane change request received from the plane change requesting unit 11 is judged to be a plane switch request, the control unit 12 executes step S101 and subsequent steps; when the plane change request is judged to be an on-screen subtitle display request, step S109 and subsequent steps are executed (step S100).

When the plane change request from the plane change requesting unit 11 is a plane switch request (step S100), the control unit 12 obtains from the data storage unit 15 the picture-plane configuration information item $150_q$ specified by the plane switch request, and identifies new animation data to be newly generated, out of the animation data identified by the picture-plane configuration information item $150_q$ (step S101). More specifically, when the plane switch request specifies a picture ID, the control unit 12 compares the configuration elements of the picture-plane configuration information item $150_q$ corresponding to the picture ID with the configuration elements of the picture-plane configuration information item $150_r$ ($r \neq q$) corresponding to the current display plane. On the basis of the results of the comparison, the control unit 12 judges that it is unnecessary to generate animation data agreeing with the existing animation data that have already been placed in the OSD memory 18, out of the animation data identified by the picture-plane configuration information item $150_q$, and identifies new animation data (step S101). The control unit 12 then reports information (object data name and type of display operation pattern) needed to generate new animation data to the animation data generation unit 16, and sends animation data generation instructions to the animation data generation unit 16.

In response to the generation instructions from the control unit 12, the animation data generation unit 16 obtains from the data storage units 13, 14 the object data segment $130_p$ and information indicating one or more types of display operation patterns assigned to the object data segment $130_p$, generates new animation data including the object data segment $130_p$ and corresponding display control commands, and reports the data size of the new animation data to the control unit 12 (step S102). Here, the animation data generation unit 16 can assign multiple types of display operation patterns to a single object data segment. Therefore, animated images of a complexly moving object can be generated.

When the report is received from the animation data generation unit 16, the control unit 12 determines the data size of all the animation data configuring the next display plane, and stores the animation data generated by the animation data generation unit 16 in the storage region for the next display plane of the OSD memory 18 (step S103). Now, the control unit 12 copies the existing animation data the generation of which is judged in step S101 to be unnecessary, from the storage region for the current display plane onto the storage region for the next display plane (such as from an area in the first plane $P_A$ to an area in the second plane $P_B$) in the OSD memory 18. This step makes it possible to eliminate the time needed to generate existing animation data again and to transfer the data to the OSD memory 18, consequently reducing the time needed to display the next display plane data.

The control unit 12 then obtains the coordinates of drawing positions of all the animation data configuring the next display plane data, with reference to the picture-plane configuration information item $150_q$, and generates a picture-plane display list for the next display plane (step S104). The control unit 12 next stores the data of the picture-plane display list in the area for the next display plane of the OSD memory 18 (step S105) and sends a reproduction switch request to the drawing unit 17 (step S106).

When it receives the reproduction switch request from the control unit 12, the drawing unit 17 references the picture-plane display list specified by the control unit 12, obtains animation data items specified in the picture-plane display list, and generates animated images by decoding the object data segment included in the animation data (step S107). The image display unit 19 performs a process to display the display plane data including the animated images generated by the drawing unit 17 (step S108).

When it is judged in step S100 that the plane change request is an on-screen subtitle display request, the control unit 12 sends a request to generate text data and on-screen subtitle data specified by the on-screen subtitle display request to the animation data generation unit 16. In response to the generation request, the animation data generation unit 16 reads a series of vector font data (outline font data) corresponding to the text data from the data storage unit 13, generates animation data on the basis of the read vector font data series, and reports completion to the control unit 12 (step S109).

More specifically, the animation data generation unit 16 splits the read vector font data series into a plurality of vector font data groups $VP_1$ to $VP_K$ (where K is a positive integer not smaller than '2') in units of a fixed number of characters. The animation data generation unit 16 generates animation data including the vector font data groups $VP_1$ to $VP_K$ and a display control command to run the character string of the vector font data groups $VP_1$ to $VP_K$ repeatedly from one end to the other end in the display plane. Here, the display control command is configured to include a command to position the beginning of the character string of an n-th vector font data group $VP_n$ (where n is any of 1 to K−1) in the bottom right area of the display plane and then move this character string of the vector font data group $VP_n$ horizontally from the bottom right area to the left by a constant distance in each frame, a command to position the beginning of the character string of an n+1-th vector font data group $VP_{n+1}$ in the bottom right area when the end of the character string of the vector font data group $VP_n$ moves into the effective region of the display plane and then move the character string of the vector font data group $VP_{n+1}$ horizontally from the bottom right area to the left by a constant distance in each frame, and a command to erase the character string that has exit from the effective region of the display plane.

The control unit 12 next stores the animation data generated by the animation data generation unit 16 in an area provided for the next display plane in the OSD memory 18 (step S110) and reads the picture-plane display list for the current display plane from the OSD memory 18 (step S111). The control unit 12 further generates a new picture-plane display list by adding information on the drawing position of the vector font data to the read picture-plane display list (step S104) and sends a reproduction switch request to the drawing unit 17 (step S106). The drawing unit 17 then receives the reproduction switch request from the control unit 12, references the picture-plane display list specified by the control unit 12, obtains individual animation data items specified in the picture-plane display list, decodes the object data segment and vector font data included in the animation data, thereby generating animated images (step S107). The image display unit 19 performs a process to display the display plane data including the animated images generated by the drawing unit 17 (step S108). Then, the character string is displayed as an on-screen subtitle in the display plane in the image display unit 19.

If the plane change request from the plane change requesting unit 11 is a plane switch request, when the control unit 12 stores the animation data in the area for the next display plane of the OSD memory 18 in step S103, the animation data for on-screen subtitle display can be copied from the area for the current display plane onto the area for the next display plane, if the animation data for on-screen subtitle display is stored in the area for the current display plane of the OSD memory 18. The control unit 12 stores information indicating whether the animation data for on-screen subtitle display is stored in the area for the current display plane of the OSD memory 18, and can use the information. In step S104, the control unit 12 adds information indicating the drawing position of the vector font data to the picture-plane display list for the next display plane. Then, the on-screen subtitle display can be continued even when the picture plane is switched.

As described above, in the first embodiment, the image generating apparatus 1 obtains the object data segment $130_p$ and the display operation pattern assigned to the data from the data storage units 13, 14 on the basis of the specified picture-plane configuration information item $150_q$ and can generate animated images on the basis of the combination of the object data segment $130_p$ and the display operation pattern. Because the minimum object data segments $130_1$ to $130_N$ needed should be stored in the data storage unit 13, the size of the storage region required to generate animated images can be reduced.

Since the animation data generation unit 16 generates animation data corresponding to the object data segment $130_p$ dynamically, vector animation data of each display plane does not need to be stored beforehand, and the storage capacity (size) of the OSD memory 18 can be suppressed. Further, since the control unit 12 dynamically generates a picture-plane display list that determines the drawing position of the object data segment $130_p$ provided with the animation operation in the display plane, and the drawing unit 17 generates animated images in accordance with the combination of the picture-plane display list and animation data, complex and diverse animated images can be generated.

Second Embodiment

A second embodiment according to the present invention will next be described. The basic configuration of an image display apparatus in the second embodiment is the same as the configuration of the image generating apparatus 1 in the first embodiment. In the second embodiment, the structure of the OSD memory 18 is the structure shown in FIGS. 10A, 10B, 10C. As shown in FIG. 10A, the OSD memory 18 in the second embodiment has storage regions of a plurality of planes $P_C$, $P_D$, etc. as well as the same storage regions as the first plane $P_A$ and the second plane $P_B$ shown in FIGS. 8A, 8B, 8C. The planes $P_C$, $P_D$, etc. are regions for storing animation data and a picture-plane display list in advance. For example, data for displaying special emergency information, frequently selected data, or data that takes time to generate dynamically can be placed beforehand in some of the planes $P_C$, $P_D$, etc.

Figure 11:
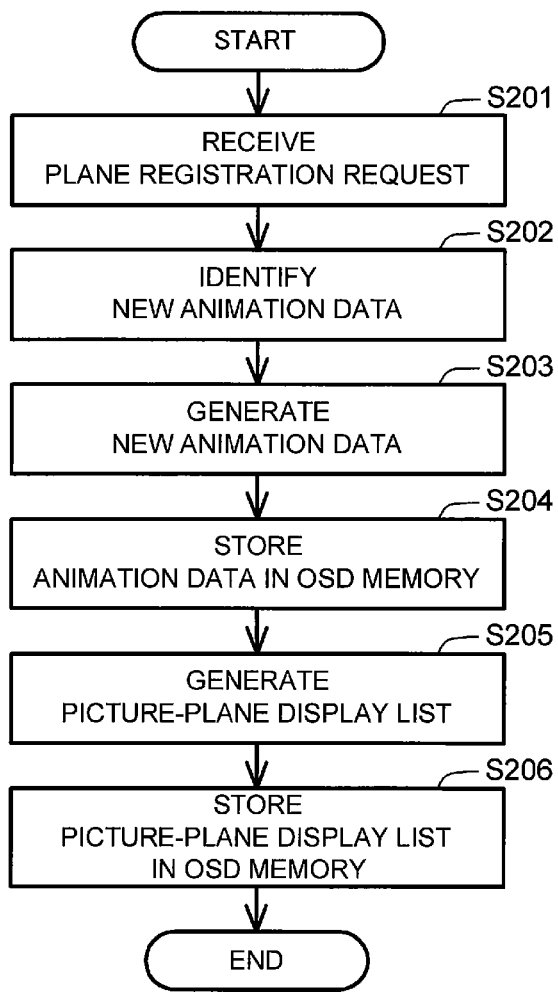
FIG. 11 is a flowchart schematically illustrating steps of a plane registration process in the second embodiment.

FIG. 11 is a flowchart schematically illustrating steps of a plane registration process in the second embodiment. When the plane change requesting unit 11 outputs a plane registration request with a picture ID to the control unit 12, the plane registration process shown in FIG. 11 starts.

When the plane registration request is received from the plane change requesting unit 1 (step S201), the control unit 12 compares the configuration elements of the picture-plane configuration information item $150_q$ corresponding to the specified picture ID with the configuration elements of the picture-plane configuration information item $150_r$ (r≠q) corresponding to the current display plane. Based on the results of comparison, the control unit 12 judges that it is unnecessary to generate animation data that are the same as the existing animation data already placed in the OSD memory 18, out of the animation data identified by the picture-plane configuration information item $150_q$, and identifies new animation data (step S202). The control unit 12 then reports information (object data name and type of display operation pattern) needed to generate new animation data to the animation data generation unit 16 and sends animation data generation instructions to the animation data generation unit 16.

In response to the generation instructions from the control unit 12, the animation data generation unit 16 obtains the object data segment $130_p$ and information indicating one or more types of display operation patterns assigned to the data, from the data storage units 13, 14, generates new animation data including the object data segment $130_p$ and the corresponding display control command, and reports the data size of the new animation data to the control unit 12 (step S203).

Figure 10:
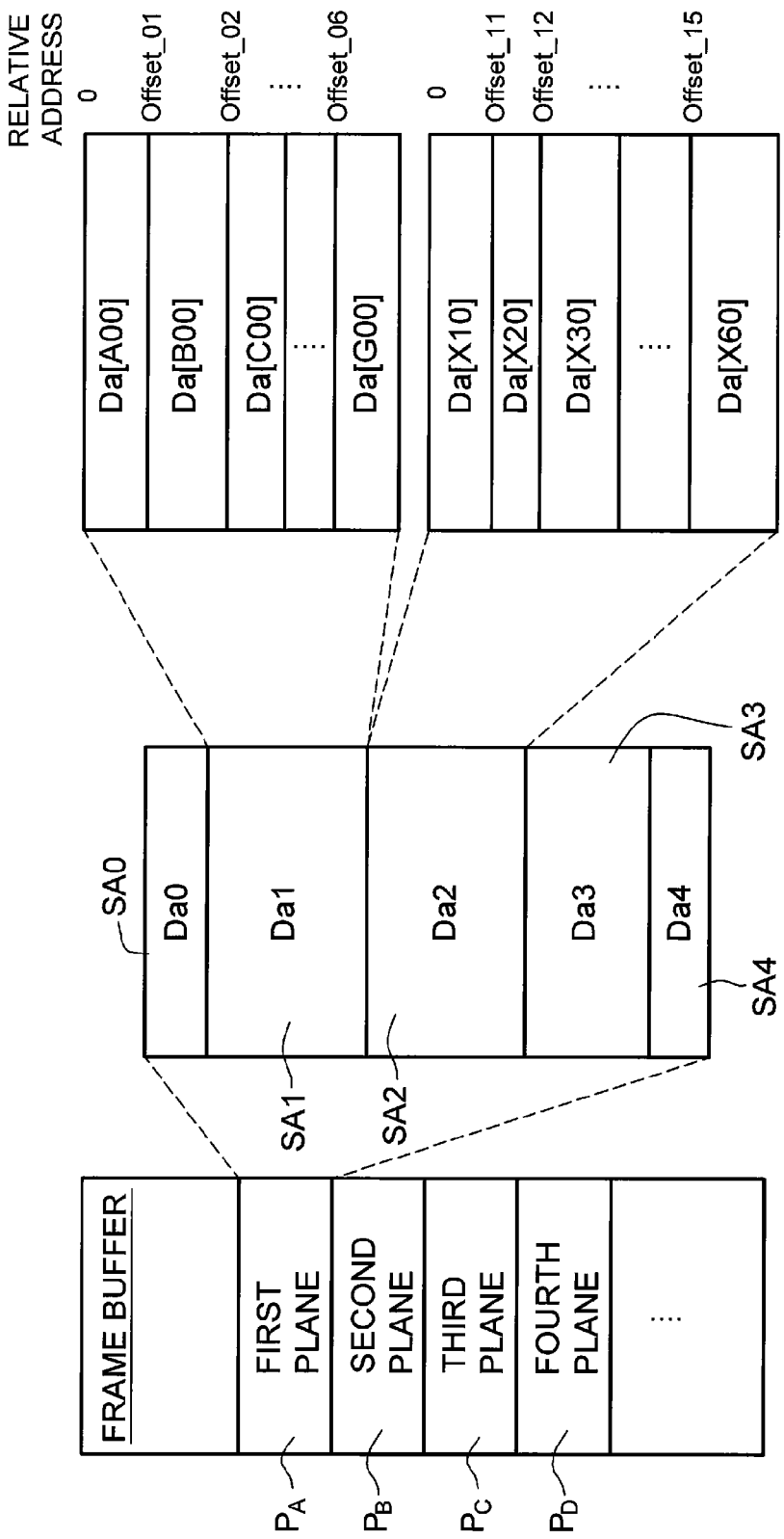
FIGS. 10A, 10B, and 10C are views showing an example of the storage regions of an OSD memory in a second embodiment of the present invention.

When the report is received from the animation data generation unit 16, the control unit 12 determines the data size of all the animation data configuring the picture plane for registration and stores the animation data generated by the animation data generation unit 16 in the storage region for the picture plane for registration (such as any region of any of the planes $P_B$, $P_C$, $P_D$ shown in FIG. 10) in the OSD memory 18 (step S204). Here, the control unit 12 copies the existing animation data the generation of which is judged to be unnecessary in step S202 from the storage region for the current display plane onto the storage region for the picture plane for registration in the OSD memory 18. Since this eliminates time needed to generate the existing animation data again and transfer the data to the OSD memory 18, the time needed for the plane registration process can be reduced.

The control unit 12 then obtains the coordinates of the drawing positions of all the animation data configuring the picture plane for registration with reference to the picture-plane configuration information item $150_q$ and generates a picture-plane display list for the picture plane for registration (step S205). The control unit 12 next stores the data of the picture-plane display list in the region for a picture plane for registration of the OSD memory 18 (step S206) and ends the plane registration process.

Figure 12:
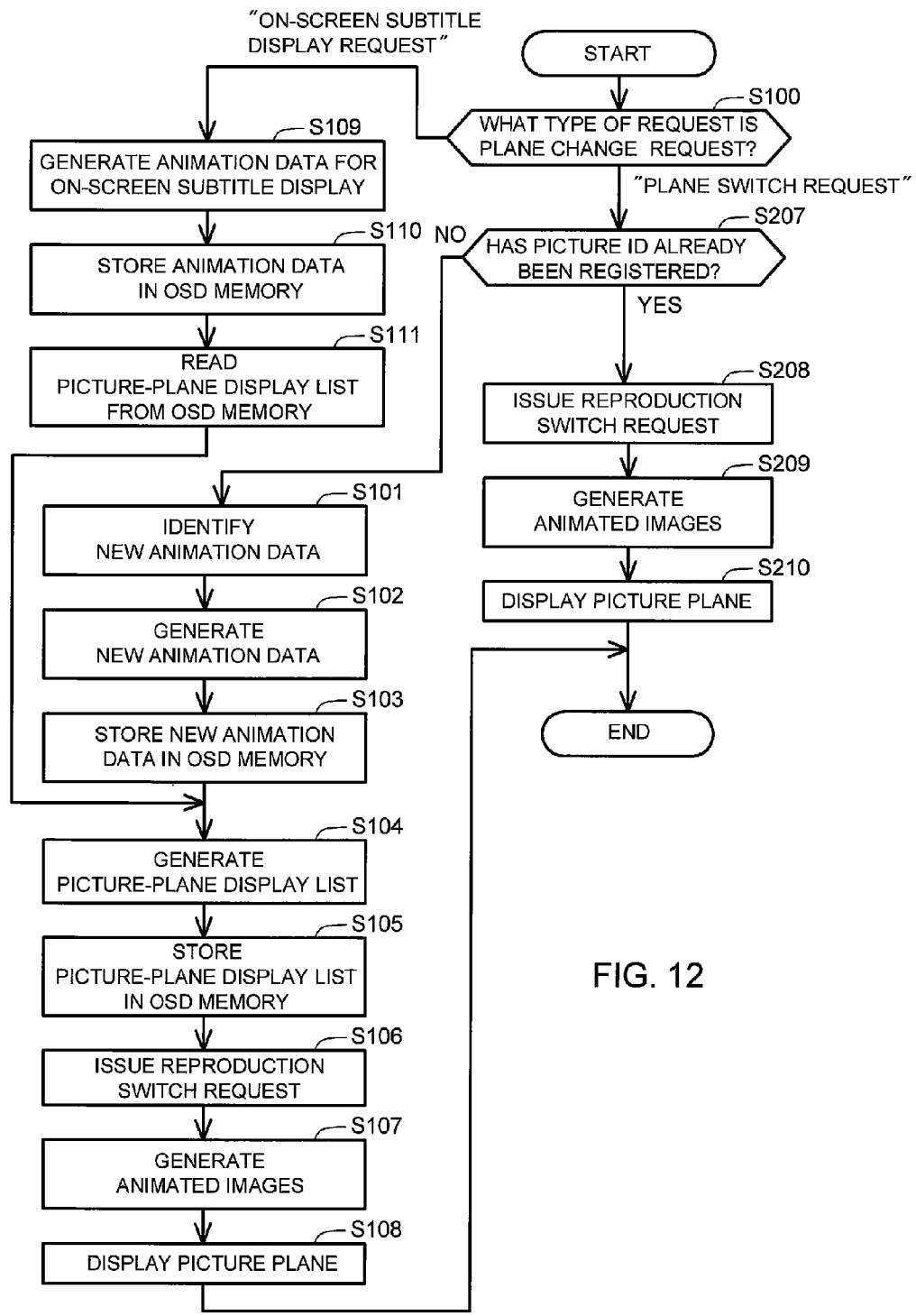
FIG. 12 is a flowchart schematically illustrating steps of an image generation process in the second embodiment.

FIG. 12 is a flowchart schematically illustrating steps of an image generation process in the second embodiment. When the plane change requesting unit 11 issues a plane change request, the control unit 12 starts the image generation process shown in FIG. 11.

When it is judged that the plane change request received from the plane change requesting unit 11 is a plane switch request, the control unit 12 executes step S207 and subsequent steps; when the plane change request is judged to be an on-screen subtitle display request, the control unit 12 executes step S109 and subsequent steps (step S100). Steps S109 to S111 shown in FIG. 12 are the same as steps S109 to S111 shown in FIG. 9.

When the plane change request from the plane change requesting unit 11 is a plane switch request (step S100), the control unit 12 confirms whether the specified picture ID has already been registered (step S207). If the specified picture ID has not yet been registered, that is, if the display plane data (animation data and picture-plane display list) corresponding to the specified picture ID are not stored in the OSD memory 18 (NO in step S207) in the plane registration process shown in FIG. 11, the control unit 12 executes steps S101 to S108. Steps S101 to S108 shown in FIG. 12 are the same as steps S101 to S108 shown in FIG. 9.

If the specified picture ID has already been registered, that is, if the display plane data (animation data and picture-plane display list) corresponding to the specified picture ID have already been stored in the OSD memory 18 (YES in step S207) in the plane registration process shown in FIG. 11, the control unit 12 sends a reproduction switch request to the drawing unit 17 (step S208).

When it receives the switch request from the control unit 12, the drawing unit 17 references the picture-plane display list specified by the control unit 12, obtains individual animation data specified in the picture-plane display list, and generates animated images by decoding the object data segment included in the animation data (step S209). The image display unit 19 performs a process to display the display plane data including the animated images generated by the drawing unit 17 (step S210).

As described above, in the second embodiment, the picture plane for registration can be displayed quickly by storing the picture-plane display list and animation data beforehand in the OSD memory 18 in the plane registration process shown in FIG. 11 and by using them. If the specified picture ID has already been registered (YES in steps S100 and S207) when the plane change requesting unit 11 issues a plane switch request, the picture plane can be switched to the picture plane for registration immediately.

Embodiments of the present invention have been described with reference to the drawings. The first and second embodiments can be applied to consumer equipment such as television sets, which display a vast number of combinations of display planes and objects (display items), onboard equipment, display equipment installed in railway vehicles, and so on.

REFERENCE CHARACTERS

1: an image generating apparatus; 11: a plane change requesting unit; 12: a control unit; 13, 14, 15: data storage units; $130_1$ to $130_N$: object data segments, 140: an animation table; $150_1$ to $150_N$: picture-plane configuration information items; 16: an animation data generation unit; 17: a drawing unit; 18: an OSD memory; and 19: an image display unit.

What is claimed is:

1. An image generating apparatus comprising:
a first data storage unit for storing a plurality of vector graphics data segments;
a second data storage unit for storing operation information defining a plurality of types of display operation patterns for any one of the vector graphics data segments in units of frames by using transformation matrices;
a third data storage unit for storing a plurality of picture-plane configuration information items which identifies a vector graphics data segment to be displayed in a display plane, out of the plurality of vector graphics data segments, and also identifies a display operation pattern to be assigned to the vector graphics data segment to be displayed, out of the plurality of types of display operation patterns;
an image generation unit for obtaining a graphics data segment from the first data storage unit, in accordance with the picture-plane configuration information item specified out of the plurality of picture-plane configuration information items, obtaining a display operation pattern to be applied to the obtained vector graphics data segment from the third data storage unit, and generating animated images of the obtained vector graphics data segment in accordance with the obtained vector graphics data segment and the obtained display operation pattern; and
a memory having first and second storage regions,
the image generation unit including:
an animation data generation unit for generating animation data including the obtained vector graphics data segment and display control data corresponding to the obtained vector graphics data segment, on the basis of the obtained vector graphics data segment and the obtained display operation pattern;
a list generation unit for generating picture-plane display lists, each picture-plane display list defining a drawing position of each of the vector graphics data segments in the display plane;
a drawing unit for generating the animated images by decoding the vector graphics data segments in accordance with the animation data; and
a control unit, wherein:
the picture-plane display lists and the animation data are stored in the memory;
the drawing unit generates the animated images in accordance with the picture-plane display lists and the animation data stored in the memory;
one of the first and second storage regions is used as a region where one of the picture-plane display lists and the animation data for a current display plane are stored;
the other of the first and second storage regions is used as a region where another one of the picture-plane display lists and the animation data for a next display plane are stored; and
the control unit copies existing animation data in said one of the first and second storage regions onto the other of the first and second storage regions, without having the animation data generation unit generate the same animation data as the existing animation data stored in said one of the first and second storage regions among the animation data to be generated for the next display plane.

2. The image generating apparatus of claim 1, wherein:
the first data storage unit further stores a plurality of vector font data segments;
the animation data generation unit obtains a vector font data segment corresponding to specified text data from the first data storage unit, and generates animation data including the obtained vector font data segment and on-screen subtitle display control data corresponding to the obtained vector font data segment; and
the drawing unit generates the animated images by decoding the vector graphics data segment and the vector font data segment in accordance with the picture-plane display list and the animation data.

3. The image generating apparatus of claim 1, further comprising a registration unit for receiving a plane registration request, wherein:

the animation data generation unit obtains a vector graphics data segment for registration from the first data storage unit in accordance with the picture-plane configuration information item corresponding to the plane registration request among the plurality of picture-plane configuration information items, obtains a display operation pattern for registration to be assigned to the vector graphics data segment for registration from the third data storage unit, and generates animation data for registration including the vector graphics data segment for registration and display control data corresponding to the vector graphics data segment for registration in accordance with the vector graphics data segment for registration and the display operation pattern for registration;

the list generation unit generates a picture-plane display list for registration which defines a drawing position of each of the vector graphics data segments for registration in a display plane; and the memory stores the picture-plane display list for registration and the animation data for registration.

4. The image generating apparatus of claim 3, wherein:

the image generation unit further includes a judgment unit for judging whether the picture-plane display list corresponding to the specified picture-plane configuration information item agrees with the picture-plane display list for registration; and the drawing unit generates the animated images in accordance with the picture-plane display list for registration and the animation data for registration when it is judged that the picture-plane display list corresponding to the specified picture-plane configuration information item agrees with the picture-plane display list for registration.

5. The image generating apparatus of claim 1, wherein the picture-plane configuration information item has the same graphics data segment to which the display operation patterns are assigned.

6. An image generating method comprising:

a step of identifying a vector graphics data segment to be displayed in a display plane, out of a plurality of vector graphics data segments, and referencing a third data storage unit storing a plurality of picture-plane configuration information items identifying a display operation pattern to be assigned to the vector graphics data segment to be displayed, out of a plurality of types of display operation patterns for any one of the plurality of vector graphics data segments;

a step of obtaining a vector graphics data segment and a display operation pattern to be applied to the vector graphics data segment, from a first data storage unit storing the plurality of vector graphics data segments and a second data storage unit storing operation information defining the plurality of types of display operation patterns in units of frames by using transformation matrices, in accordance with the picture-plane configuration information item specified out of the plurality of picture-plane configuration information items;

a step of generating animated images of the obtained vector graphics data segment in accordance with the obtained vector graphics data segment and the obtained display operation pattern;

a step of generating animation data including the obtained vector graphics data segment and display control data corresponding to the obtained vector graphics data segment, on the basis of the obtained vector graphics data segment and the obtained display operation pattern;

a step of generating picture-plane display lists, each picture-plane display list defining a drawing position of each of the vector graphics data segments in the display plane;

a step of storing the picture-plane display lists and the animation data in a memory;

a step of generating the animated images by decoding the vector graphics data segments in accordance with the picture-plane display lists and the animation data stored in the memory;

a step of judging whether the picture-plane display list corresponding to a specified display plane has already been registered to the memory; and a step of reading from the memory animation data for registration corresponding to the picture-plane display list for registration when it is judged that the picture-plane display list corresponding to the specified display plane has been registered, and generating animated images in accordance with the picture-plane display list for registration and the animation data for registration, the picture-plane display list and the animation data being generated when it is judged that the picture-plane display list corresponding to the specified display plane does not agree with the picture-plane display list for registration.

7. The image generating method of claim 6, further comprising a step of obtaining a vector font data segment corresponding to specified text data and generating animation data including the obtained vector font data segment and on-screen subtitle display control data corresponding to the obtained vector font data segment, the animated images being generated by decoding the vector graphics data segment and the vector font data segment in accordance with the picture-plane display list and the animation data.

* * * * *